(No Model.) 3 Sheets—Sheet 1.

L. MILLER.
HARVESTER BINDER.

No. 271,254. Patented Jan. 30, 1883.

Attest.
W. N. N. Knight,
Fred F. Church.

Inventor,
Lewis Miller
By Hine & Church,
His Attys.

(No Model.) 3 Sheets—Sheet 2.
L. MILLER.
HARVESTER BINDER.
No. 271,254. Patented Jan. 30, 1883.
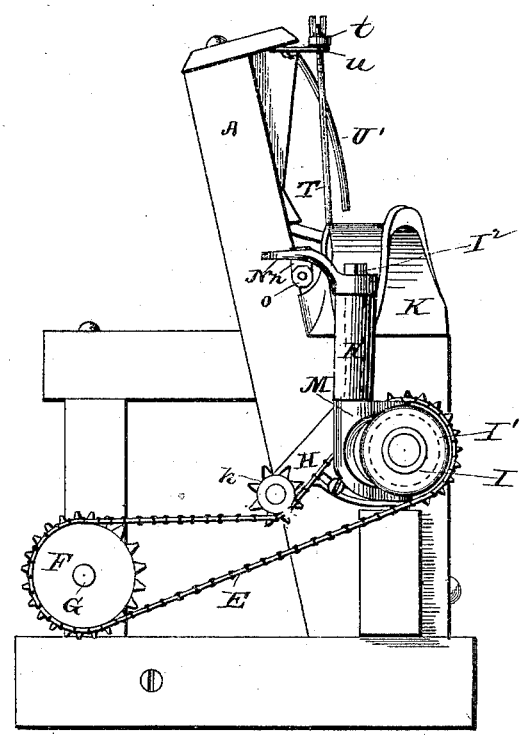
Fig. 3.
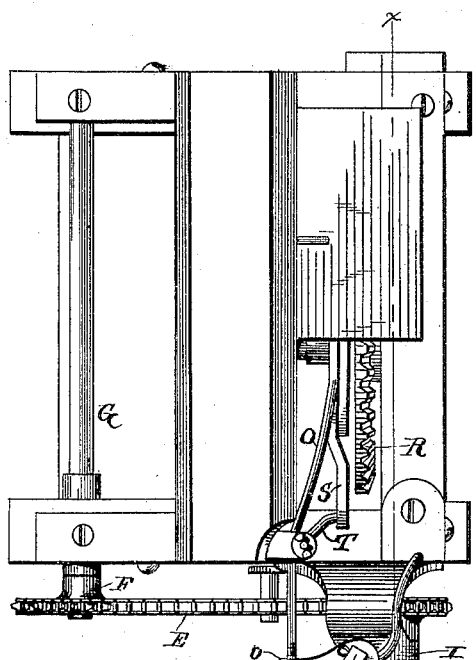
Fig. 4.

(No Model.)

3 Sheets—Sheet 3.

L. MILLER.
HARVESTER BINDER.

No. 271,254. Patented Jan. 30, 1883.

Attest,
W. H. H. Knight
Fred F. Church.

Inventor,
Lewis Miller
By Hill & Church
His Atty

UNITED STATES PATENT OFFICE.

LEWIS MILLER, OF AKRON, OHIO.

HARVESTER-BINDER.

SPECIFICATION forming part of Letters Patent No. 271,854, dated January 30, 1883.

Application filed September 7, 1881. (No model.)

*To all whom it may concern:*

Be it known that I, LEWIS MILLER, of Akron, in the county of Summit and State of Ohio, have invented certain new and useful Improvements in Harvester-Binders; and I do hereby declare the following to be a full, clear, and exact description of the same, reference being had to the accompanying drawings, forming a part of this specification, in which—

Figure 1:
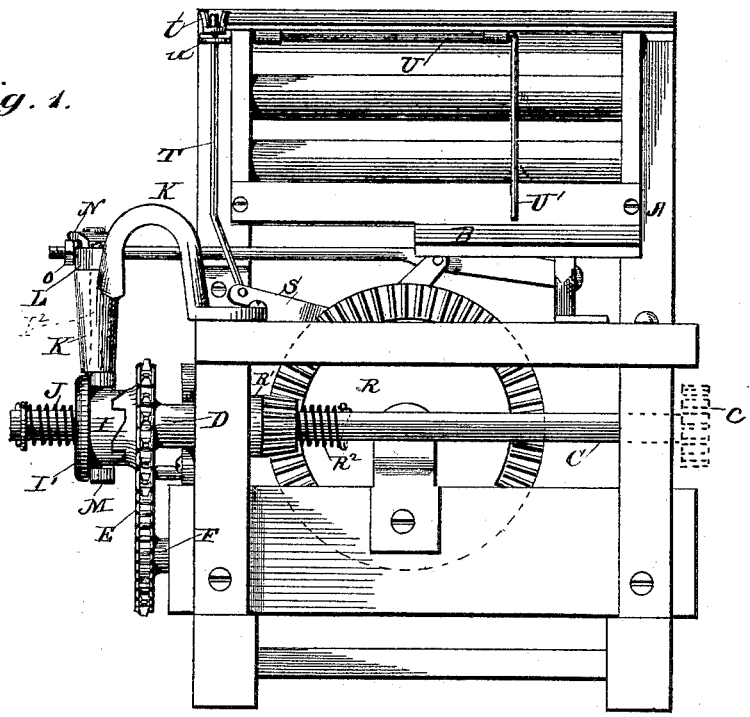
Figure 2:
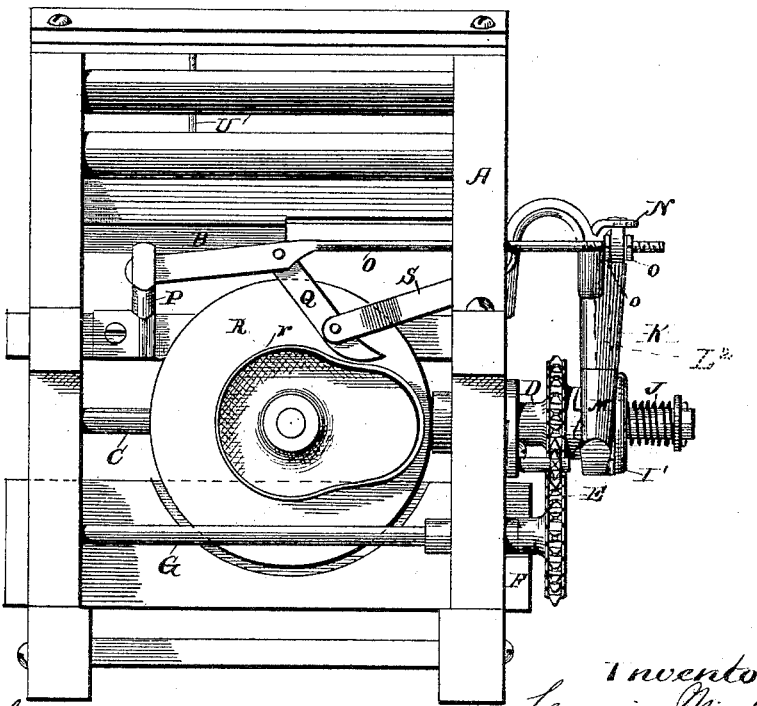
Figure 5:
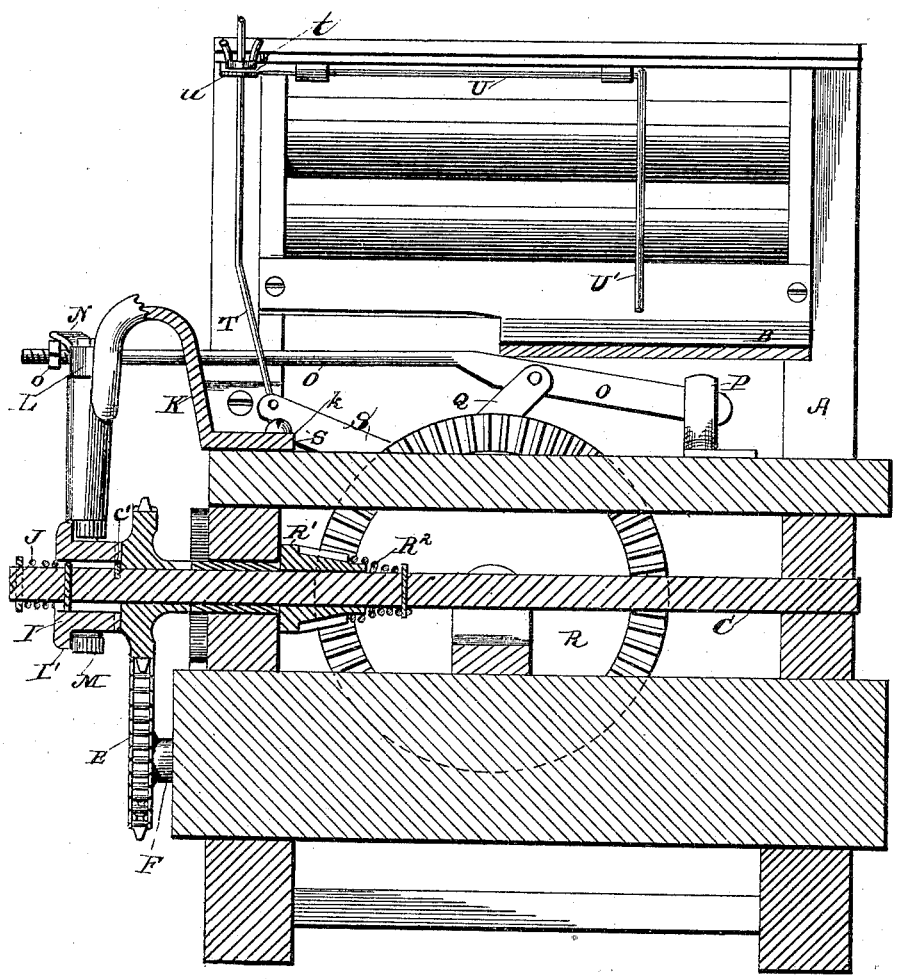

Figure 1 is a front elevation; Fig. 2, a rear elevation; Fig. 3, an end view; Fig. 4, a top view; Fig. 5, a view of a section taken on the line $x\, x$, Fig. 4.

Similar letters of reference in the several figures denote the same parts.

This invention relates to improvements in harvester-binders; and it consists in certain novelties of construction, which I will now proceed to describe.

Referring to the accompanying drawings, A represents a portion of the frame of a harvester-binder; B, a part of the binding-table, upon which the grain is delivered by means of an elevator or other contrivance in the ordinary manner.

C is a shaft, from which the binding-arm (not shown) is adapted to be driven by means of a pinion, $c$, arranged on its end, as shown in dotted lines, Fig. 1. Upon this shaft C, near its opposite end and outside of the frame, is loosely mounted, so as to turn independently thereof, a sprocket-wheel, D, having clutch-teeth on the outside of its hub, and prevented from longitudinal movement on the one hand by the frame A, or a collar interposed between it and the frame, and on the other hand by a pin, $c'$, in the shaft, as shown in Fig. 5. This sprocket-wheel is adapted to be driven by an endless chain, E, which passes around another sprocket-wheel, F, mounted upon the main driving-shaft G, and is kept under proper tension by means of a small wheel, $h$, mounted upon an adjustable arm, H, as shown. Also mounted upon the shaft C, outside of the sprocket-wheel D, is a clutch, I, having clutch-teeth which are adapted to engage with the corresponding clutch-teeth of the sprocket-wheel D. This clutch I is capable of a longitudinal movement upon the shaft, but is prevented from an independent rotary movement thereon by a feather and groove. A spiral spring, J, operates to force it into engagement with the sprocket-wheel at certain times.

Mounted in a bracket or casting, K, secured to the frame of the machine, is a rock-shaft, L, carrying a bifurcated arm, M, at its lower end, that embraces the sliding clutch I and operates against the peripheral flange I' thereof, and having secured to its upper end an arm, N. Connected to this arm N, so as to turn freely thereon, is a socket, $n$, through which passes the screw-threaded portion of a horizontal rod, O, having nuts $o\, o$ working upon it on opposite sides of said socket for the purpose of holding it in position. The opposite end of said bar O is adapted to work back and forth in a guide, P, secured to the frame, and to it is articulated an arm, Q, having a rounded lower end, which is adapted to rest upon a cam-flange, $r$, formed on the rear side of a large bevel-gear wheel, R, as shown in Fig. 2. Articulated in turn to the arm Q is another arm, S, which has a shoulder, $s$, that at certain times engages with the edge $k$ of the casting K.

Connected to and extending upward from the outer end of the arm S is a rod, T, the upper end of which passes through a perforation in an arm, $u$, of a rock-shaft, U, and is screw-threaded and provided with an adjusting-nut, $t$, above said arm $u$. The rock-shaft U is mounted in suitable bearings secured to the frame, and is provided with a downwardly-projecting arm or lever, U', which is preferably slightly curved outward, and extends in close proximity to the binding-table, as shown.

The large bevel-gear wheel R is adapted to be driven by a pinion, R', mounted loosely upon the driving-shaft C, but prevented from more than a slight independent rotary movement thereon by means of a spiral spring, R², connected to it and also to said shaft. In the normal position of the mechanism the cam-flange $r$ on the gear-wheel R supports the arms Q S in a nearly horizontal position, with the shoulder $s$ of the arm S engaged with the edge of the casting K, as aforesaid. The sliding bar O is drawn backward, as is also the arm N on the rock-shaft, while the bifurcated arm M on said rock-shaft is pressed outward, so as to bear against the peripheral flange I' of the sliding clutch I and hold said clutch disengaged from the sprocket-wheel D and permit the latter to rotate freely and continuously upon the shaft C. Let it be supposed that the shaft C is stationary and that the binding-arm, threaded with cord or wire, is in an elevated position, and that the shoulder on the arm S is in engagement with the edge of casting K, and that the cam-flange r is in such position that it holds the arm O withdrawn, and therethrough holds the clutch and sprocket disengaged. Now, as the grain is brought up by the elevator or other contrivance and delivered onto the binding-table it bears against the curved arm or lever U', and when a sufficient quantity has accumulated there to form a bundle of the required size it presses said arm outward, thereby rocking the shaft U, and, through the rod T, lifting the arm S, so as to disengage its shoulder s from the edge of the casting. Immediately this is done, the spiral spring J, being relieved from compression, forces the sliding clutch I into engagement with the rotating sprocket-wheel D, thereby setting into motion the driving-shaft C and causing the binding-arm to descend and apply the band around the bundle, and causing also the bevel-pinion R' to operate upon the large bevel-gear wheel R to automatically reset the mechanism. When in such resetting operation the gear-wheel R has rotated a short distance the arms Q S again drop down at an angle to each other, with the shoulder s of the arm S again behind the edge of the casting K, as before. On nearing the completion of the rotation of the gear-wheel the cam-flange r raises the joint of the levers Q S, and causes them with a toggle-like action to draw back upon the horizontal rod O and through the instrumentality of the rock-shaft I² and its levers cause the clutch I to be again thrown out of engagement with the sprocket-wheel D and the shaft C to cease to rotate. While the arms Q S are being straightened out by the operation of the cam-flange r the friction between the end of arm Q and the said cam-rim causes the motion of the large gear-wheel to be somewhat retarded. The bevel-pinion R' is of course likewise retarded; but the shaft C, on which the pinion is mounted, runs at the same speed as before, the flexible connection of the pinion to the shaft through the spiral spring R² permitting this. By this arrangement the operation of the levers Q S to throw the clutch is made gradual instead of with a jerk and danger of breakage, and undue wearing of the parts is avoided. The forcing of the clutch out of engagement with the sprocket-wheel D causes the latter to bear against the pin c', and consequently to draw the shaft C longitudinally very slightly in its bearings; but when the clutch-teeth are completely disengaged the spring R² on the pinion R' reacts on the shaft and returns it to its normal position, thus effectually holding the clutch-teeth out of engagement and preventing their interlocking till the proper time again.

As the quantity of grain allowed to accumulate behind the arm U', or, in other words, the size of the gavel, regulates the frequency with which the mechanism is tripped to throw the binding-arm into operation, it is evident that by adjusting the said arm so as to accommodate more or less grain behind it the machine may be adapted to the binding of bundles of any required size. Such adjustment can be effected by manipulating the nut t on the upper end of the rod T, so as to diminish or increase the distance from the said nut to the arm u of the rock shaft U, and consequently limit the loose play of the arm U'.

I claim as my invention—

1. The combination, with the shaft from which the binding-arm is driven, of the continuously-rotating sprocket-wheel, the sliding clutch, the vertical rock-shaft and its arms, the horizontal bar, the articulated lever-arms, the flanged gear-wheel, and the bevel-pinion with the horizontal rock-shaft carrying the depending arm and the rod connecting the rock-shaft to one of the articulated arms, whereby the mechanism is tripped by an accumulation of grain and then automatically reset, substantially as described.

2. The combination, with the shaft carrying the loosely-mounted and continuously-rotating sprocket-wheel and the clutch, of the bevel-pinion, also mounted on said shaft and connected to it by means of the spiral spring, and the large bevel-gear wheel with which the bevel-pinion meshes, substantially as described, for the purpose specified.

LEWIS MILLER.

Witnesses:
N. N. LEOHNER,
L. H. HANSCOM.